March 4, 1969
F. BRISCHNIK
3,431,464
VOLTAGE REGULATION APPARATUS WITH AN OPTICAL FEEDBACK
Filed April 20, 1966
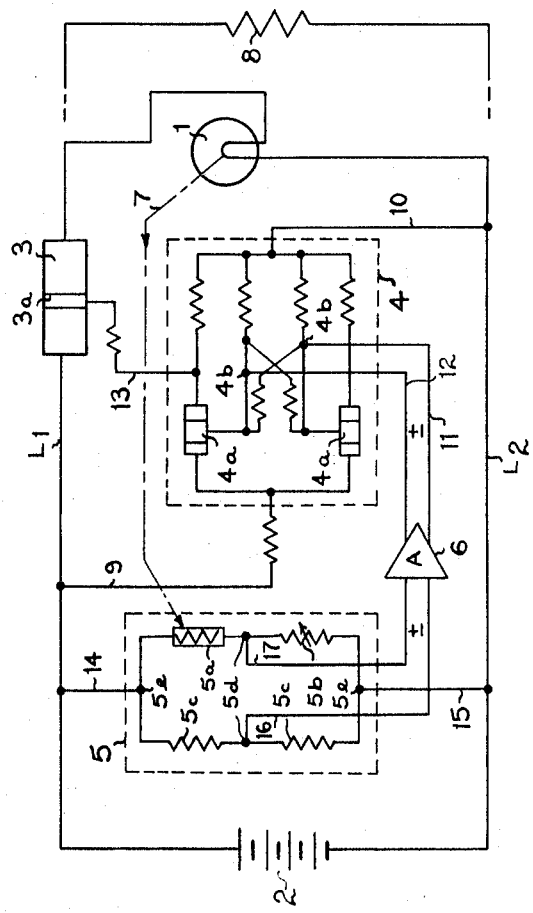
INVENTOR.
*Franz Brischnik*
BY
*Pierce, Scheffler & Parker*
Attorneys United States Patent Office 3,431,464
Patented Mar. 4, 1969

3,431,464
VOLTAGE REGULATION APPARATUS WITH AN OPTICAL FEEDBACK
Franz Brischnik, Neuenhof Aargau, Switzerland, assignor to Aktiengesellschaft Brown, Boveri & Cie, Baden, Switzerland, a joint-stock company
Filed Apr. 20, 1966, Ser. No. 543,949
Claims priority, application Switzerland, Apr. 26, 1965, 5,720/65
U.S. Cl. 315—158     2 Claims
Int. Cl. H05b 37/02, 39/04, 41/392

ABSTRACT OF THE DISCLOSURE

A system for maintaining a constant effective voltage across a load which is supplied with power from a source such as a battery in which the voltage tends to decline with usage comprises an incandescent lamp which is at least part of the total load supplied by the battery, a bridge circuit having its input connected across the battery and including in one arm an adjustable resistance and in another arm a photo-sensitive resistance linked to the lamp to receive its radiation, the bridge circuit producing a control voltage at its output having a polarity and amplitude determined by the magnitude and sense of the difference between the voltages produced across the two bridge resistances, a switching transistor located in the circuit between the battery and the load, and a transistorized timer controlled by the bridge output voltage which provides variably timed pulses to the control element of the switching transistor that effect such a change in the ratio of the conductive to cut-off times of the switching transistor as will tend to reduce the bridge output voltage to zero.

---

The present invention relates to electrical voltage regulating devices and more particularly to an improved arrangement for maintaining the effective voltage across a load at a constant value.

In the operation of an electrical load which is fed in pulsed fashion from a battery or similar current source wherein the terminal voltage cannot be kept at a constant value, it may, however, be most desirable to maintain the effective voltage across the load at a constant value. This result can be accomplished in the simplest fashion, for example, by connecting an adjustable resistance member in series with the load, and regulating the resistance of this member in dependence upon the effective voltage value at the load. A principal disadvantage with this type of regulating device is that appreciable power losses take place in the resistance member. This is a disadvantage when incandescent lamps, for example, are fed in this manner from batteries, more particularly those of the primary type or, more recently, by means of fuel cell elements, since it is essential to avoid additional losses in the interest of obtaining the longest possible life for the battery or fuel cell.

Thus, in order to carry out regulation with pulsed operation and with the smallest possible loss factory, the load is switched on-and-off periodically, the ratio of current conduction time to current cut-off time being made dependent upon a control voltage. If the load is an incandescent lamp, it is expedient to make the switching frequency sufficiently high that the thermal inertia of the lamp is practically sufficient to prevent the lamp from exhibiting any visible fluctuations in the intensity of the light which it produces. The present invention proceeds from the idea, in conjunction with this mode of voltage regulation, of using the inertia of an incandescent lamp, which may also be the load, for keeping the light intensity constant.

More particularly, the object of the invention is directed to a "two-point" regulator device for keeping the effective voltage value across a load constant, the load being preferably an incandescent lamp, by means of a switching element, e.g. a transistor wherein the ratio of conductive to cut-off time in the circuit between a direct current supply source of varying voltage and the load, and controlled by the switching element is controlled by a new and improved timing device.

In accordance with the invention, an incandescent lamp connected on the load side is liked by a radiant path therefrom to a radiant-electric converter, and this converter delivers a control voltage, in the form of an actual value, for the timer which in turn controls the on-off time for the switching element.

The foregoing as well as other objects and advantages inherent in the invention will become more apparent from the following detailed description of one suitable embodiment thereof, and from the accompanying drawing, the single figure of which is a schematic circuit diagram for the load voltage regulating device.

With reference now to the drawing, the incandescent lamp across which it is desired to keep the effective voltage value constant is indicated at 1, and the purpose for maintaining this constant voltage is to maintain a constant value for the intensity of the light which it produces. The power supply of variable voltage for lamp 1 is illustrated as a battery 2 and is connected with the lamp via conductors L1 and L2. This battery is assumed to have the characteristic inherent in all batteries, namely, that its terminal voltage will drop in a gradual manner during a fairly long period of operation. The battery may be one of the so-called primary type wherein the terminal voltage drops off gradually during the life of the battery. It may also be one of the secondary type, e.g. a nickel-iron accumulator, in which the voltage drops off as the battery becomes discharged. Another type of battery which may be assumed to be used in a fuel cell wherein the electrolyte must be renewed from time to time, the terminal voltage of the cell gradually dropping off as the cell is used.

For switching the load circuit on-and-off between battery 2 and its load 1, a switching element, e.g. a switching transistor 3 is inserted in feed conductor L1. Transistor 3 is switched periodically between full load current conduction and complete cut-off. The ratio of conductive time to cut-off time is determined by the effective current value fed to the lamp 1, and to any other load, indicated at 8 which may be paralleled with the lamp. The necessary control action is carried out by means of a timer unit 4 which functions in known manner, on the principle of a sweep generator, and is connected across the load conductors L1 and L2 by the wire connections 9 and 10. Timer unit 4 includes switching transistors 4a, and a positive (+) or negative (−) control voltage for these switching transistors is fed over conductors 11 and 12 to terminal 4b from the output of an amplifier unit 6 whose input is constituted by the output of a bridge circuit 5. A conductor connection 13 extends from timer unit 4 to the control junction 3a on the main switching transistor 3.

Bridge circuit 5 includes two input terminals 5e connected by conductors 14 and 15 to the load conductors L1 and L2 and is thus powered from battery 2. The output terminals of the bridge are indicated at 5d and these are connected via conductors 16, 17 to the input of amplifier 6. One side of bridge 5 between the input terminals 5e in constituted by two series connected resistance elements 5c which cannot be operationally adjusted in value. The other side of the bridge is constituted by two series connected resistance elements 5a and 5b. Resistance element 5a has a photo-sensitive characteristic and its resistance value varies in accordance with the amount of visible radiation received by it. It can thus be viewed as one form of a radiant-electric converter. The other resistance element 5b is of the adjustable type and its function is to enable the bridge to be balanced for the purpose of making the apparatus ready for operation. Since the control according to the invention is made to depend upon a variation in intensity of the radiation produced by lamp 1, a radiant "link" or path is established from lamp 1 to the photo-sensitive resistance element 5a and this is indicated schematically on the circuit diagram by the dash-dot line 7. The radiation link may take various forms. Photo-sensitive resistance element 5a may be so positioned as to lie directly in a path of radiation from the lamp, or the radiation from the lamp may be piped to the resistance element 5a via a light guide, or one can employ a lens, or mirror system for carrying radiation from the lamp to the photo-sensitive resistance element 5a.

A "return action" is thus imparted to the load voltage regulating device, some of the radiation from the lamp acting on the photo-resistance element 5a as a radiant-electric converter. The actual resistance value of the bridge resistance element 5a, i.e. its instantaneous value, which varies in accordance with the actual or instantaneous variation in intensity of radiation from lamp 1 thus establishes an actual or instantaneous value for the control voltage. Bridge 5 is balanced by means of adjustment of resistance element 5b such that with a normal i.e. a desired value of the light flux or radiation from lamp 1 and mean battery voltage, no current will flow in the bridge 5. Consequently, the bridge output voltage at terminals 5d is zero. The voltage across adjustable resistance element 5b thus becomes a measure of the desired value for the control voltage. Bridge balance will be independent of battery voltage provided that the photo-sensitive resistance element 5a is dependent only upon the light flux falling on it from lamp 1, and not on the voltage across it.

The amplitude and polarity of the bridge output voltage across terminals 5d will thus depend upon the magnitude and sense of the voltage difference across resistances 5a and 5b. Thus, if the intensity in radiation from lamp 1 should fall below the normal value which characterizes the effective voltage desired to be maintained at the lamp, this will produce an unbalanced condition of the bridge 5 in one direction and produce a correcting output voltage of one polarity which is applied via amplifier 6 to terminals 4b of the timer unit 4 and to the control for switching transistors 4a and is reflected by a change in the proper sense in the ratio of the conduction to cut-off time of the main switching transistor 3 as will restore the lamp voltage to the desired value. Conversely, should the radiation from lamp 1 rise above the normal value, bridge 5 will become unbalanced in the opposite direction and produce a correcting output voltage of opposite polarity which when refletced into terminals 4b of the timer unit produces a change in the opposite sense for the ratio of conduction to cut-off time for switching transistor 3.

The "return action" via radiation link 7 may be performed predominantly by light-radiation from lamp 1, or only by heat-radiation therefrom. If it is required that the brightness of the incandescent lamp 1 be kept constant, the radiation-path link 7 comprises predominantly light-radiation. If a load 8 whereof it is required to keep the effective voltage or current value constant, is connected in parallel circuit with lamp 1, the latter may function as a heat-radiator of low brightness. The radiant-electric converter must then be in a form which will enable it to respond to heat-radiation, for example a thermo-element.

In conclusion, the two-point regulator device according to the invention enables an incandescent lamp, in particular, to be regulated to constant brightness notwithstanding the use of a variable source voltage to supply it, and without any attendant power losses of any appreciable magnitude. It is accordingly most suitable for use with battery-fed devices, e.g. with methanol-air-oxygen fuel cell elements which are used to supply lamps in marine signalling equipment.

I claim:
1. A system for maintaining a constant effective voltage across a load which is supplied with power from a direct current source such as a battery in which the voltage tends to decline with usage, said system comprising a radiant energy producing device such as an incandescent lamp which constitutes at least part of the total load supplied from said power source, a switching device connected in the circuit extending between said power source and load and which operates in such manner as to periodically interrupt the current flow from said power source to said load, and means for regulating the ratio of the conductive to cut-off times of said switching device to maintain a substantially constant effective voltage across said load notwithstanding a gradual decline in the voltage delivered by said power source, said load voltage regulating means comprising a multiple arm bridge circuit having its input terminals connected across said power source, an adjustable resistance element connected in one of said bridge arms, a photo-sensitive resistance element connected in another of said bridge arms, means linking said photo-sensitive resistance element to said radiant energy producing device for receiving radiant energy therefrom, said bridge producing at its output terminals a difference voltage having a polarity and amplitude determined by the magnitude and sense of the difference between the respective voltages produced across said adjustable resistance element and said photo-sensitive resistance element, and means controlled by said difference voltage for effecting a corresponding change in the ratio of conductive to cut-off times of said switching device in such sense as to tend to reduce said difference voltage towards zero.

2. An electrical power supply system as defined in claim 1 for maintaining a substantially constant effective voltage across a load wherein said switching device is constituted by a main switching transistor and wherein said means controlled by said difference voltage for effecting a corresponding change in the ratio of conductive to cut-off times of said main switching transistor is constituted by a transistorized timer, said timer including auxiliary switching transistors connected across said power source and which delivers variably timed pulses to the control element of said main switching transistor, and wherein said difference voltage is applied at least indirectly to the respective control elements of said auxiliary switching transistors in said timer.

References Cited
UNITED STATES PATENTS 2,810,105  10/1957  Henrich _____ 323—22
2,969,498  1/1961   Stenuud _____ 323—22
3,358,217  12/1967  Deelman _____ 315—158 X JAMES W. LAWRENCE, *Primary Examiner.*

C. R. CAMPBELL, *Assistant Examiner.*

U.S. Cl. X.R.
315—151; 250—205; 323—21, 22.